Figure 1:
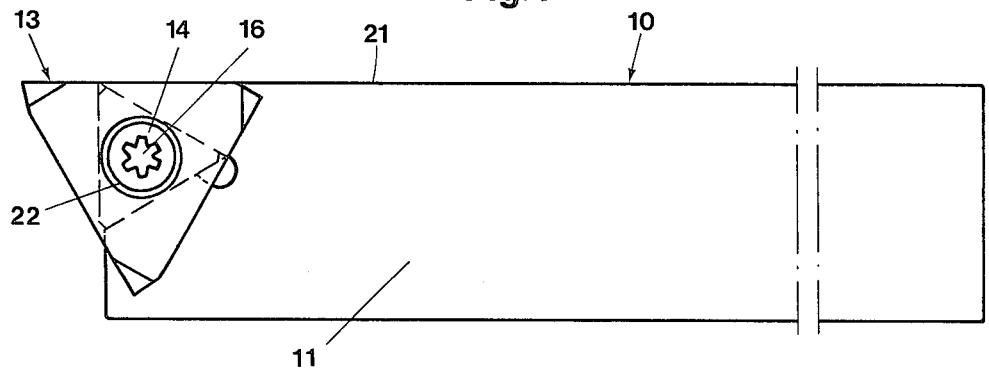

United States Patent [19]

Roos

[11] 4,320,996
[45] Mar. 23, 1982

[54] CUTOFF TOOL

[75] Inventor: Axel S. O. Roos, Sandviken, Sweden

[73] Assignee: Sandvik Aktiebolag, Sandviken, Sweden

[21] Appl. No.: 197,610

[22] Filed: Oct. 16, 1980

[51] Int. Cl.³ .......................... B26D 1/12; B26D 1/00
[52] U.S. Cl. .................................... 407/103; 407/113
[58] Field of Search ............... 407/103, 104, 105, 106, 407/113, 114

[56] References Cited

U.S. PATENT DOCUMENTS

| | | | |
|---|---|---|---|
| 2,838,827 | 6/1958 | Wright | 407/113 |
| 3,121,939 | 2/1964 | Williams | 407/113 |
| 3,180,006 | 4/1965 | Emmous | 407/113 |
| 3,742,565 | 7/1973 | Boboltz et al. | 407/113 X |
| 3,938,230 | 2/1976 | Rice | 407/114 X |
| 4,074,949 | 2/1978 | Hochmuth et al. | 407/114 |

FOREIGN PATENT DOCUMENTS 1204054 8/1959 France ................. 407/113

*Primary Examiner*—Harrison L. Hinson
*Attorney, Agent, or Firm*—Burns, Doane, Swecker & Mathis

[57] ABSTRACT

The invention provides a cutoff tool that enables more narrow grooves to be produced in comparison with cutoff tools of conventional design. The tool consists of a holder 10 having a recess 12 in one side face 11 in which a cutting insert 13 is located and clamped by means of a center screw 14 threadably engageable with the holder 10. According to the invention the insert 13 is of polygonal shape and provided with a protruding central portion 20, which is received in said recess 12 in the holder, whereas the remainder of the insert extends laterally from the holder for cutoff purposes. The protrusion 20 is polygonal in shape in correspondence with the shape of the insert but angularly offset therefrom.

4 Claims, 3 Drawing Figures

CUTOFF TOOL

The present invention relates to a cutting tool and in particular to a tool for grooving and parting off operations, comprising a holder and a cutting insert releasably secured thereto, said insert being in the shape of a polygon the corners of which act as cutting corners.

In the art of metal cutoff the prior art used so far employs a holder to which a cutoff insert is releasably clamped. The clamping means used oftenly include a lever type clamp actuatable by a screw engageable with the toolholder. The screw is usually actuatable from the top side of the tool and the longitudinal axis of the screw usually is oriented essentially perpendicular to the longitudinal direction of the clamp or the holder. Upon inscrewing said clamp screw the opposite free end of said clamp has been urged to press the insert against its bottom supporting surface in the holder.

Cutoff toolholders available heretofore equipped with similar claiming devices have been associated with certain disadvantages or limitations. The use of cutting tools for cutoff operations nowadays requires them to be able to take very narrow cuts or recesses in the workpiece. It is desirable that loss of material can be minimized, losses that can be substantial in amount for instance when cutting off extremely long bars into short pieces. Further, it is often necessary to have the tool mounted in up-and-down position in the pertaining machine. It should be understood that use of a top clamp acting on the insert puts a lower limit upon the minimum width of the recess produced by such a tool and, furthermore, that use of such top clamp is undesirable if the tool is required to be used in up-and-down position.

According to the present invention there is now presented a solution that essentially reduces or eliminates this kind of problem.

The tool of the present invention consists of a holder and a cutting insert releasably secured to the fore end of said holder, said insert being in the shape of a polygon the central portion of which being a protrusion extending from the remainder of the insert, whilst having the same outer configuration as the insert, the polygon of said protrusion, however, being angularly offset from the polygon of the insert. This protrusion is adapted to act as an inside abutment surface to be located in abutment with an opposed side wall in a correspondingly shaped recess in the holder. This enables to have only the corners of the insert exposed for cutoff operations without simultaneously being obliged to have these corner portions of the insert dimensioned for the cooperation with pertaining clamping means acting on the top side thereof. A considerable reduction in cutoff breadth is then achievable. At the same time this also enables the insert to be clamped laterally by means of a centre screw adapted to be threadably engaged with the holder from its side surface. The top surface of the holder is then free from any protruding portions.

Figure 2:
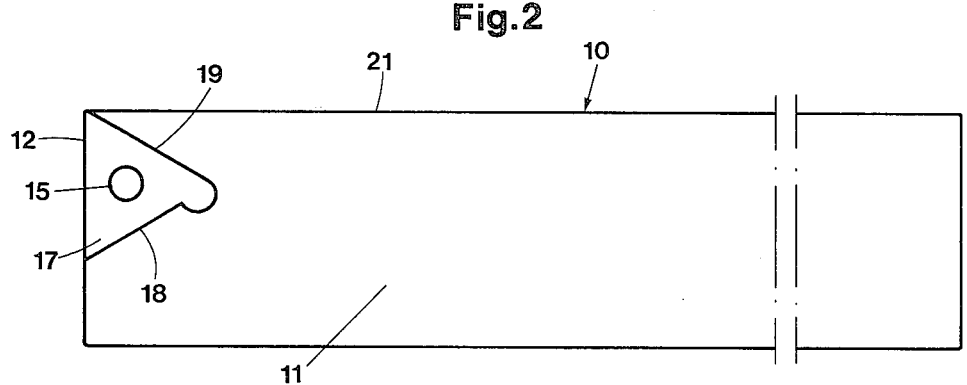
Figure 3:
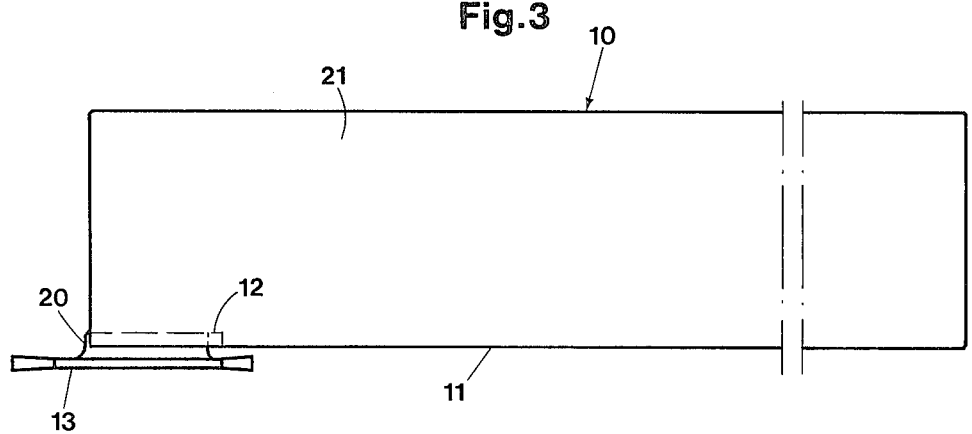

The invention will now be described more in detail with reference to the accompanying drawing in which FIG. 1 is a side view of a preferred embodiment of the cutoff tool of the present invention, FIG. 2 is a side view of the tool in FIG. 1 without pertaining cutoff insert, and FIG. 3 is a top view of the tool in FIG. 1.

The tool shown in FIGS. 1-2 comprises an elongated toolholder 10 square in cross section, thus comprising a top face, a bottom, two opposed longitudinally extending side faces generally parallel to each other, a front and a back, said holder at one side face 11 having a recess 12. A cutting insert 13 is located in said recess 12, whereby said cutting insert might consist of cemented carbide or any other similar material suitable for metal cutting purposes. The insert 13 is secured into said recess 12 by means of a centre screw 14, which passes through the insert and is threadably engageable with a transverse hole 15 provided in said holder. In order to enable simple turning and clamping the screw 14 is provided with a grip recess 16.

The recess 12 is confined by a base support surface 17, arranged in parallel with the plane of said surface 11 of the holder 10, and two angularly interrelated support surfaces 18 and 19 being arranged mainly perpendicular to support surface 17 whilst complementary to the shape of the insert 13.

The insert 13 is polygonal in shape, in this preferred embodiment in the shape of an equilateral triangle the corner portions of which are intended to act as cutting edges. The insert 13 is provided with a protruding central portion 20 which extends from the remainder of the insert. This central portion 20 has identical regular polygonal shape as the insert, said polygon, however, being angularly offset from the polygon of the insert. Only said central portion 20 of the insert is intended to be received in the recess 12, which, as appears from FIG. 1, is V-shaped.

One support surface 18 confining said recess 12 is inclined downwards towards the fore end of the holder 10, and both support surfaces 18 and 19 have their ends at the juncture with the fore end of the holder 10. The mutual orientation of said support surfaces 18 and 19 is such that a bisector to the angle between said surfaces 18 and 19 extends parallel with the longitudinal direction of the holder 10. Due to such orientation of said support surfaces 18 and 19 it has been found that the forces acting on said support surfaces 18 and 19 occurring from the pressure of the central portion 20 under the influence of the cutting forces are very moderate. It has to be understood, however, that deviations from the aforesaid interrelation of surfaces 18 and 19 might occur within the scope of the invention. In that connection it is recommended not to arrange support surface 18 such that it is inclined upwards towards the fore end of the holder 10, which would result in there being an acute-angled material portion that would suffer most from the pressure occurring from said central portion 20 under the influence of the cutting forces that would reduce the strength of the tool. Further, it is preferable from strength and stability aspects to provide the central portion 20 with a greater thickness than the remainder of the insert.

With the embodiment shown in FIGS. 1-2 the insert 13 is an equilateral triangle and the correspondingly shaped central portion 20 is angularly offset at an angle of 30°. Due to this the uppermost side edge of the insert 13, as seen in FIG. 1, will be arranged parallel and flush with the top surface 21 of the holder 10 and one side edge surface of said central portion 20 will be arranged perpendicular thereto. This result occurs from the arrangement with two support surfaces 18 and 19 that diverge forwards towards the fore end of the holder 10 and the bisector therebetween extending parallel with the longitudinal direction of the holder. The manner of clamping the insert into the holder, i.e. by means of a screw engageable from the side of the holder into a laterally extending central hole 22 of the insert 13 also renders the top surface of the tool free from any protruding screw or clamping means, thus avoiding undesirable disturbance in the chip flow rearwardly.

I claim:

1. Cutting tool for grooving and cutoff operations, comprising a tool holder (10), said holder having a top face, a bottom, two opposed longitudinally extending side faces generally parallel to each other, a front and a back, said tool holder being provided at one of its side faces with a recess (12) confined by a base support surface (17) and at side support surfaces (18, 19) upstanding therefrom, a cutting insert (13) releasably secured into said recess (12) by means of a centre screw (14) threadably engageable with a transverse bore (15) in the holder (10), characterized in, that the insert (13) is in the shape of a polygon, the central portion of which being a protrusion (20) extending from the remainder of the insert whilst being received in said recess (12), which recess is complementarily shaped with regard to said protrusion (20), said protrusion having same polygonal shape as said insert but being angularly offset therefrom.

2. Cutting tool as defined in claim 1, characterized in, that the insert is in the shape of an equilateral triangle whereas said central protrusion (20) has a corresponding triangular shape with 30° angular offset with regard to the shape of the insert.

3. Cutting tool as defined in claim 2, characterized in that said recess (12) is in the shape of a V-shaped pocket, wherein the side support surfaces (18, 19) diverge forwards to the front of the holder such that the intermediate bisector extends parallel with the longitudinal direction of said holder.

4. Cutting tool as defined in claim 3, characterized in that the recess (12) is V-shaped such that, with the insert secured thereinto, one cutting edge thereof extends parallel and flush with the top face (21) of the holder (10) whereas one side edge of the central protrusion (20) of the insert is oriented perpendicular thereto.

* * * * *